United States Patent [19]
Fisher

[11] Patent Number: 5,651,333
[45] Date of Patent: Jul. 29, 1997

[54] COLLAPSIBLE LIVESTOCK CHUTE

[76] Inventor: Dennis Fisher, Box 115 R.R. 3, Sisseton, S. Dak. 57262

[21] Appl. No.: 485,643

[22] Filed: Jun. 6, 1995

[51] Int. Cl.$^6$ .................................................. A01K 13/00
[52] U.S. Cl. .................................................. 119/734
[58] Field of Search ............................... 119/729, 734, 119/738, 744, 751

[56] References Cited

U.S. PATENT DOCUMENTS

| | | |
|---|---|---|
| 3,099,249 | 7/1963 | Newhouse, Jr. .................. 119/734 X |
| 3,220,384 | 11/1965 | Trefz .................................. 119/99 |
| 3,651,851 | 3/1972 | Curtis ................................ 160/135 |
| 3,674,303 | 7/1972 | Doonan et al. ...................... 296/24 |
| 3,744,456 | 7/1973 | Wheeler et al. ..................... 119/20 |
| 3,921,585 | 11/1975 | Hall .................................... 119/20 |
| 4,090,472 | 5/1978 | York ................................... 119/20 |
| 4,168,933 | 9/1979 | Kane ................................. 414/498 |
| 4,201,158 | 5/1980 | Parker ................................ 119/98 |
| 4,280,448 | 7/1981 | Ostermann ......................... 119/155 |
| 4,470,372 | 9/1984 | Norman .............................. 119/27 |
| 4,513,691 | 4/1985 | Wood ................................. 119/734 |
| 4,979,471 | 12/1990 | Hartshorn ........................... 119/98 |

FOREIGN PATENT DOCUMENTS

| | | | |
|---|---|---|---|
| 197708 | 8/1977 | U.S.S.R. ............................. | 119/734 |
| 882522 | 11/1981 | U.S.S.R. ............................. | 119/729 |

*Primary Examiner*—Thomas Price

[57] ABSTRACT

The present invention relates to a collapsible chute useful for transporting animals or managing them in the confines of a barn structure. The chute consists of a plurality of mounted rails attached to the wall surface of a trailer or barn. A series of rear hinged panels are pivotal hinged around the fixed rails. The panels include a side gate and a opening gate recessed in respective frames. The front portion includes a headgate for holding confined animals stationary. The panels are pivotal hinged to one another in a configuration that permits them to be alternately secured in an expanded position for confining animals or rotated to a collapsed position when not in use. The chute is held in position to confine animals by locking braces secured to a fixed position rail and the hinged panels. A remote rope assembly permits the user to control the headgate portion. The chute is reversible from one opposing wall surface to another creating mirror images. This is accomplished by reattaching the fixed rails to the opposing wall surface and rotating the remaining portion of the chute 180 degrees then reattaching the headgate.

16 Claims, 8 Drawing Sheets

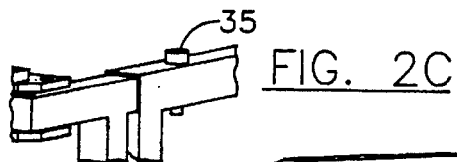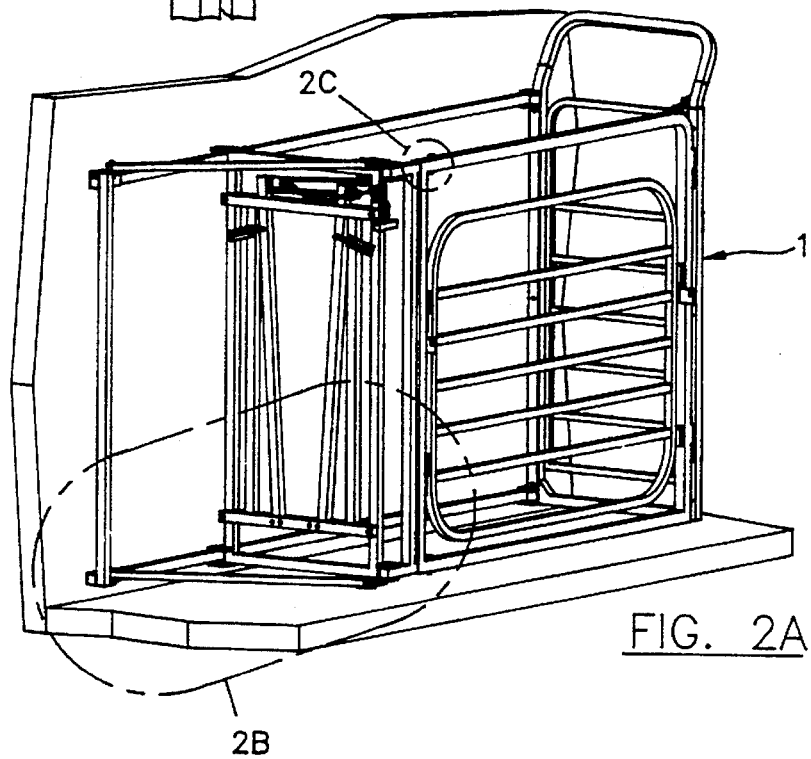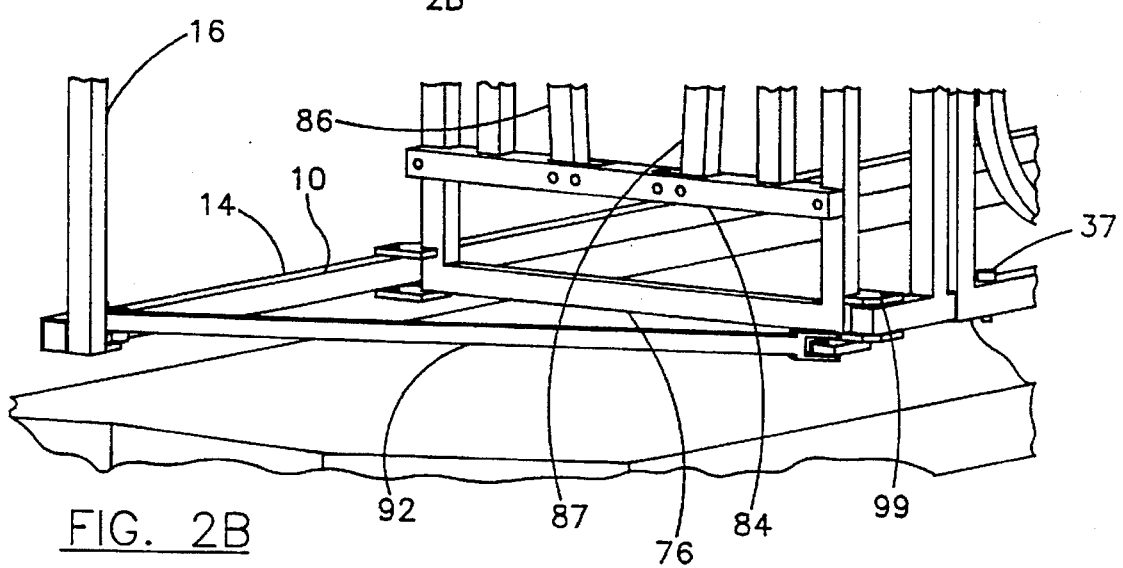

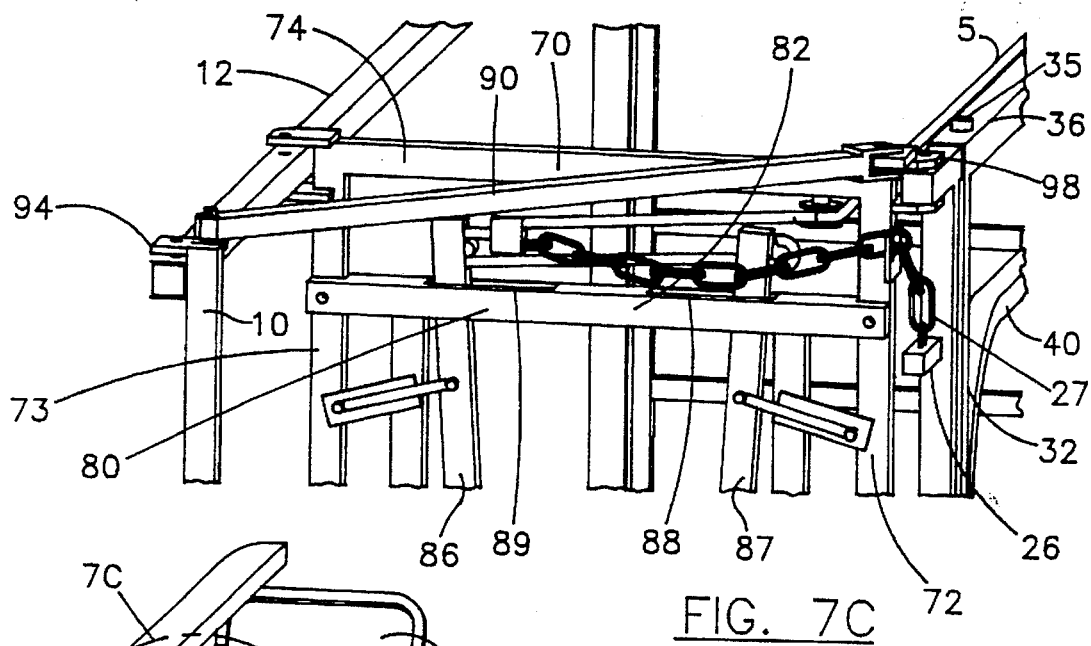
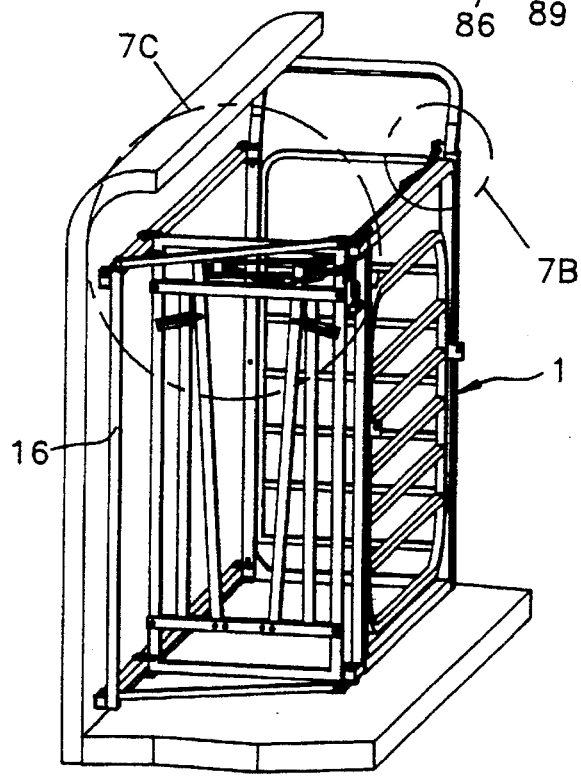
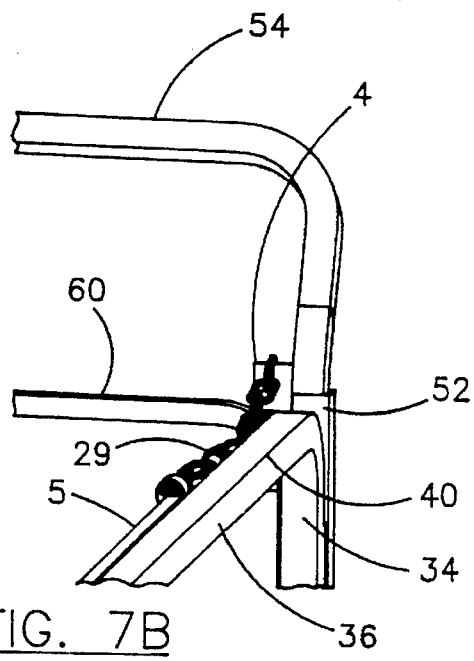
FIG. 7C
FIG. 7A
FIG. 7B

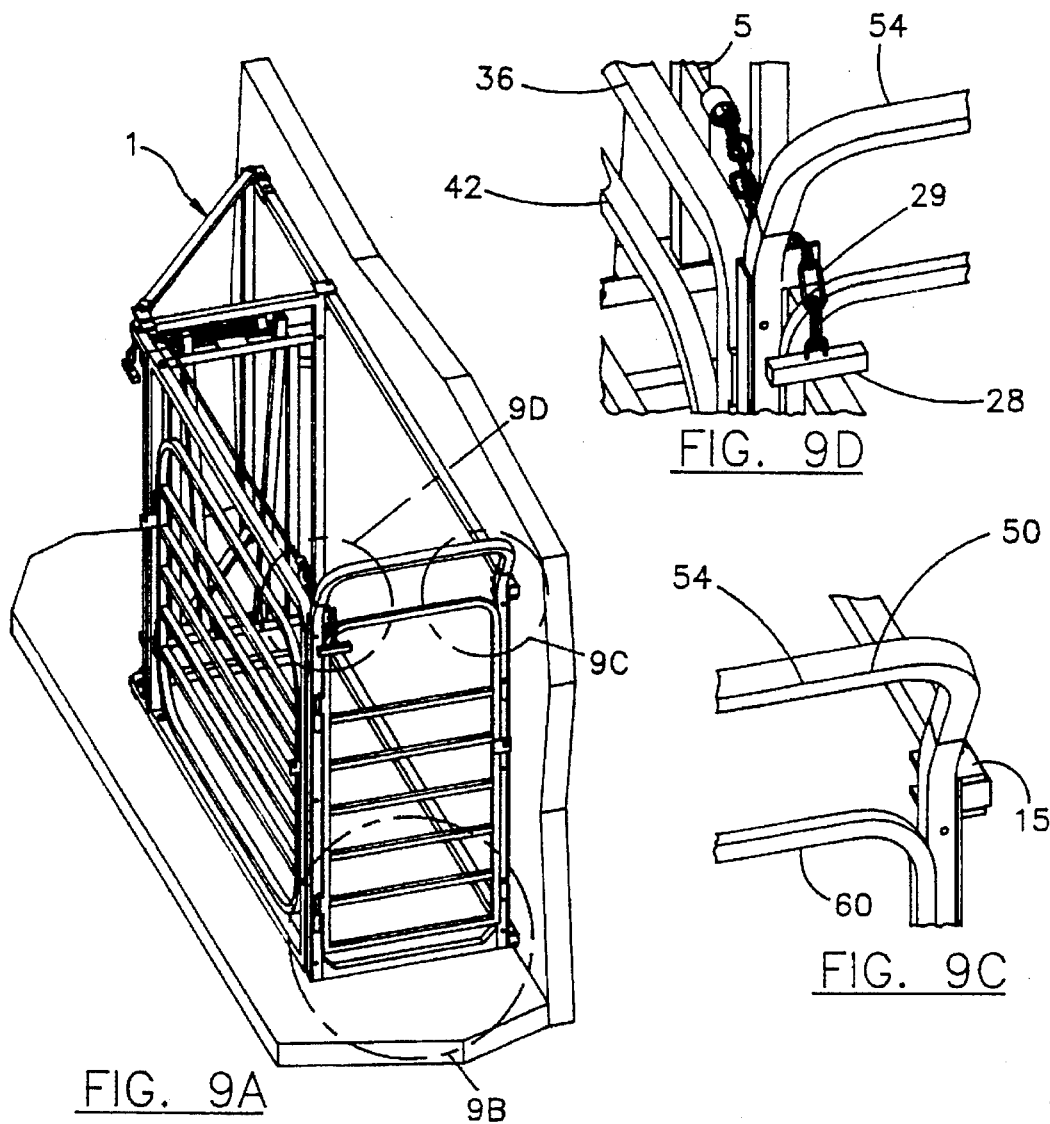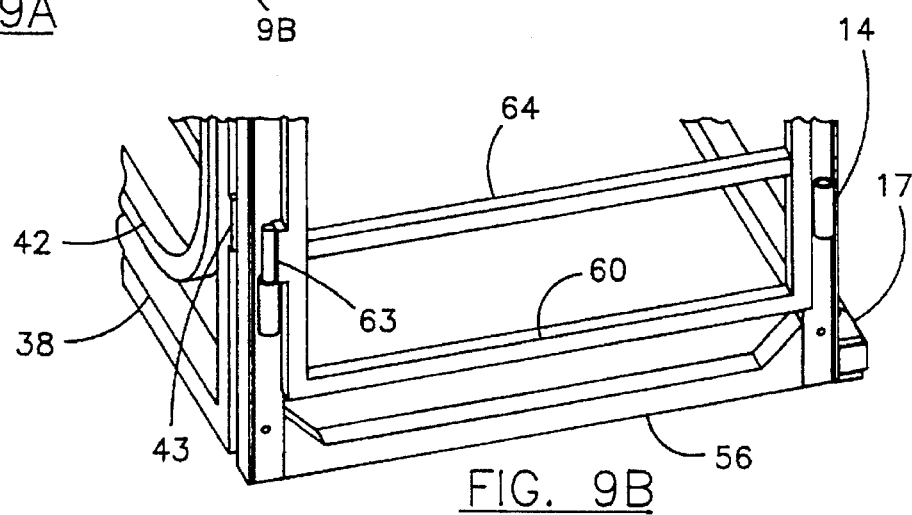

COLLAPSIBLE LIVESTOCK CHUTE

FIELD OF THE INVENTION

The invention relates generally to a chute that is useful for managing livestock and more particularly to a collapsible livestock chute that can be used in transport of animals in a trailer or in the confined space of a barn structure. The chute can be used to confine animals and may be collapsed to preserve space when not in use.

BACKGROUND OF THE INVENTION

Livestock pens and confinement stalls are well known in the farm and ranch industry. Portable and temporary stalls are used to work with cattle, sheep, horses, and other domesticated animals. The need for confinement of animals exists when they are transported in trailers of various types. This type of device is often used in temporary situations to vaccinate animals or to separate certain ones from a group for a special purpose such as cleaning, worming, or birthing inside a structure such as a barn.

Numerous types of chutes have been constructed in the past for use both inside and outside. Chutes are sometimes adapted for use in a corral system of fences and gates. Animals can be driven into a chute and confined therein. These chutes are often quite large and bulky, often built right into the fence.

Some have special features designed for a particular type of animal. U.S. Pat. No. 4,201,158 issued to Parker in 1980 includes an elevated transverse crossbar at the front of the chute to prevent a horse from rearing its legs over the front. Other designs include stanchions for capturing the head of a cow or sheep to hold the animal in a stationary position. Some chutes are designed for a specific purpose, such as sorting animals into various other pens.

These devices aim to be used with existing fence systems like a corral. Their mobility is limited generally as they are not made to be used in circumstances requiring mobility. They are often most useful in an outdoor environment and, as such, their utility is affected by weather conditions.

Other inventions are more portable in nature. The use of confinement stalls in a movable trailer is well known. Semi tractor-trailers are daily used to transport cattle and other animals. They generally use fixed sized stalls to confine animals, however. Specialized chutes of the type of this invention are generally not necessary or used for general purposes.

Trailers are sometimes used to carry confinement fences for use outside the trailer. U.S. Pat. No. 3,921,585 issued to Hall in 1975 is such a device. A system of interlocking fence panels are attached about the trailer to form a confinement pen. Other nuances of this principal exist as well. The primary focus of these inventions, however, is to create a confinement area outside the trailer vehicle. These are also pens as opposed to a chute.

Other confinement devices are directed at free standing fence pens. U.S. Pat. No. 3,651,851 issued to Curtis in 1972 demonstrates a folding pen that is pivotal held together by a series of sleeves that interlock fence panels. Though the pen is collapsible, it has limited stability as it is a free standing unit. The unit is of some use in confining an animal, but it is of limited utility for performing a number of functions due to the fact that it is not stabilized by an immobile anchoring object.

U.S. Pat. No. 4,9979,471 issued to Hartshorn in 1990 discloses a hinged confinement chute. The chute includes upright side panels with a diagonally directed front gate that may be locked in an open or closed position. The chute is portable, however, neither is not anchored to an object nor is it collapsible.

Conventional chutes and pens often have advantages when used in particular circumstances for particular purposes. There has not heretofore been a chute designed that is portable, collapsible, and able to be anchored by attachment to the wall surface of a trailer or barn structure. This is the type of device described in the present invention.

SUMMARY OF THE INVENTION

One object of the invention is to make a new livestock chute that is portable yet sturdy and is easily transported. The chute must be suitable to use in a barnyard structures or in a trailer. Another object is to supply a chute that can be attached to an immovable anchoring surface such as a wall. The chute is thereby stabilized and suitable to confine livestock in a substantially stationary position. The chute can be mounted in a trailer or in a barn structure. It should also be mountable in different directions on different surfaces of a wall surface.

A further object is to provide a portable chute that can be used to confine animals in a trailer during transport.

Another object of the invention is create a chute that is hinged so that the panels are collapsible. The collapsible feature insures that the chute can be stored in a space efficient manner. This permits trailer or barn space to be used for other purposes at appropriate times.

Still another object is to make a chute that can be readily locked in an open extended position so that animals can be effectively confined and immobilized allowing various tasks to be performed on them.

Yet another object is to construct a chute that permits the immobilization of livestock by use of stanchions in a headgate. The chute must be, constructed so that it is able to withstand sudden or violent movements by a confined animal.

A still further object is to construct a chute that allows entry and exit by dual means. This is accomplished by using a hinged rear and side gate. This allows for maximum flexibility in working with animals as circumstances dictate.

Another object of the invention is to provide a chute that can be operated by one person. This includes making the headgate so that capturing an animal in the opening between the stanchions can be controlled by an individual standing at the rear of the chute.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentation and combinations particularly pointed out in the appended claims.

These objects are accomplished in the instant invention by affixing a plurality of mounted rails to the wall surface of a trailer or barn. Disposed about the fixed rails are a side gate portion including a side releasing gate, a rear frame portion including a rear opening gate, and a front frame portion including a headgate for holding confined animals stationary. The disposed panels are pivotal hinged to one another in a configuration that permits them to be alternately secured in an expanded position for confining animals or rotated to a collapsed position when not in use.

The chute is held in the expanded position by at least one locking brace that is anchored to one end of fixed position rail and on the other end to the front frame. The capturing mechanism of the headgate stanchions is controlled by a rope assembly permitting the user to alternately open and close the space between them from the rear end of the chute so that animals can be made stationary or set free as desired.

The chute is reversible from one wall surface to another. This is accomplished by removing the fixed rails from one wall and securing them to an opposing wall surface. The headgate can be removed and the remaining panels of the chute rotated 180 degrees and reattached to the fixed trails. The headgate can then be reinstalled for use on the opposite wall surface.

BRIEF DESCRIPTION OF THE DRAWINGS

FIG. 2A is a left front perspective view of the collapsible gate in the expanded position with enlarged view of the telescopic locking feature and of the lower chute locking assembly;

FIG. 2B is a enlarged perspective view of the circled area of FIG. 2A labeled "2B";

FIG. 2C is a enlarged perspective view of the circled area of FIG. 2A labeled "2C";

FIG. 7A is a frontal view of the chute with an enlarged view of the top front headgate including the front chain locking mechanism with handle triggered by the rope assembly and the rope assembly showing the rear chain secured on the rear gate latch;

FIG. 7B is a enlarged perspective view of the circled area of FIG. 7A labeled "7B";

FIG. 7C is a enlarged perspective view of the circled area of FIG. 7A labeled "7C";

FIG. 9A is an elevated left side rear perspective view of the collapsible gate with enlarged views of the rear gate and frame attachments and the lower rear gate configuration.

FIG. 9B is a enlarged perspective view of the circled area of FIG. 9A labeled "9B";

FIG. 9C is a enlarged perspective view of the circled area of FIG. 9A labeled "9C"; and FIG. 9D is a enlarged perspective view of the circled area of FIG. 9A labeled "9D".

DETAILED DESCRIPTION OF THE PREFERRED EMBODIMENTS

Figure 1:
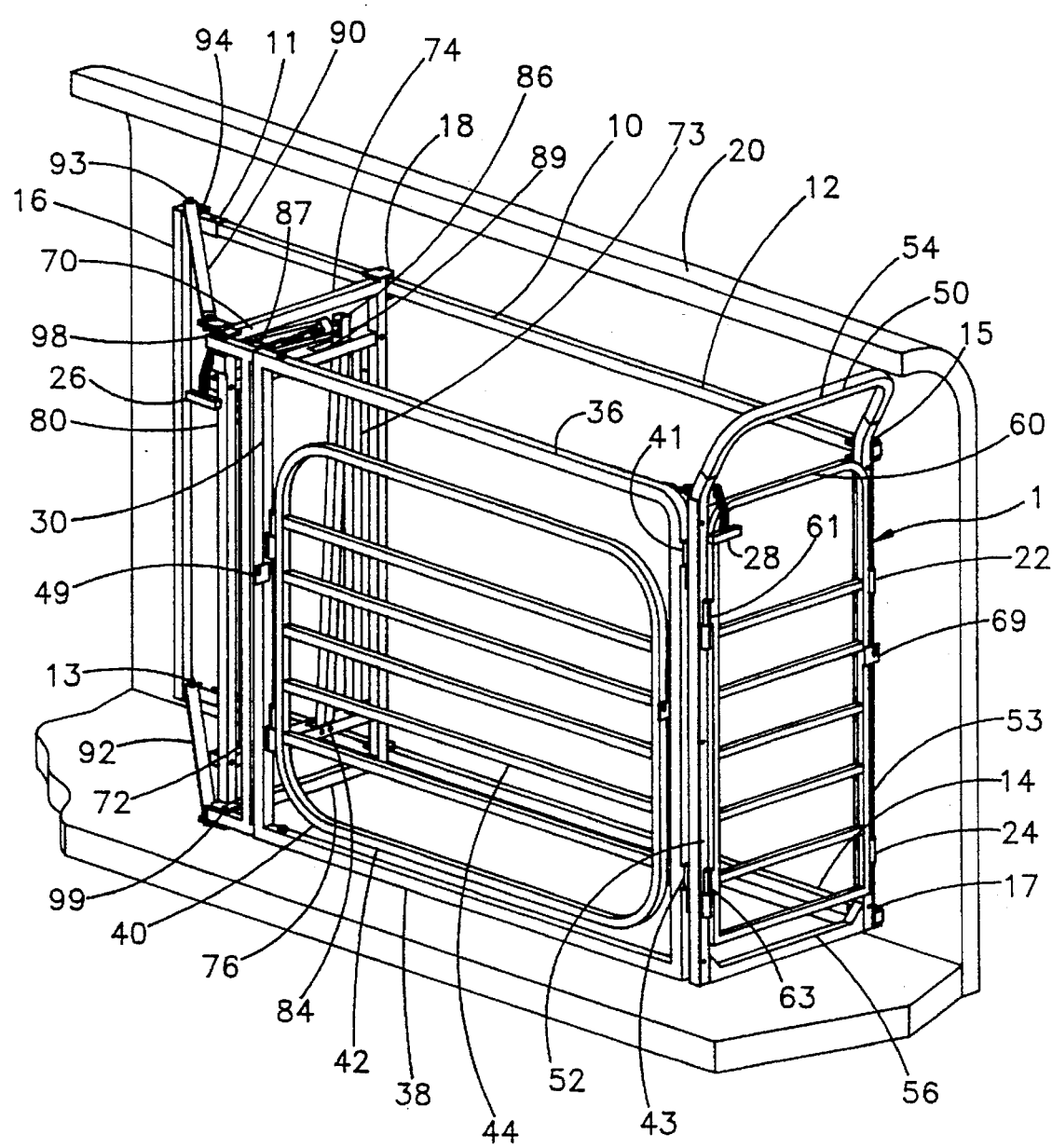
FIG. 1 is an elevated rear left side perspective view of the collapsible chute attached to a wall surface.
Figure 3:
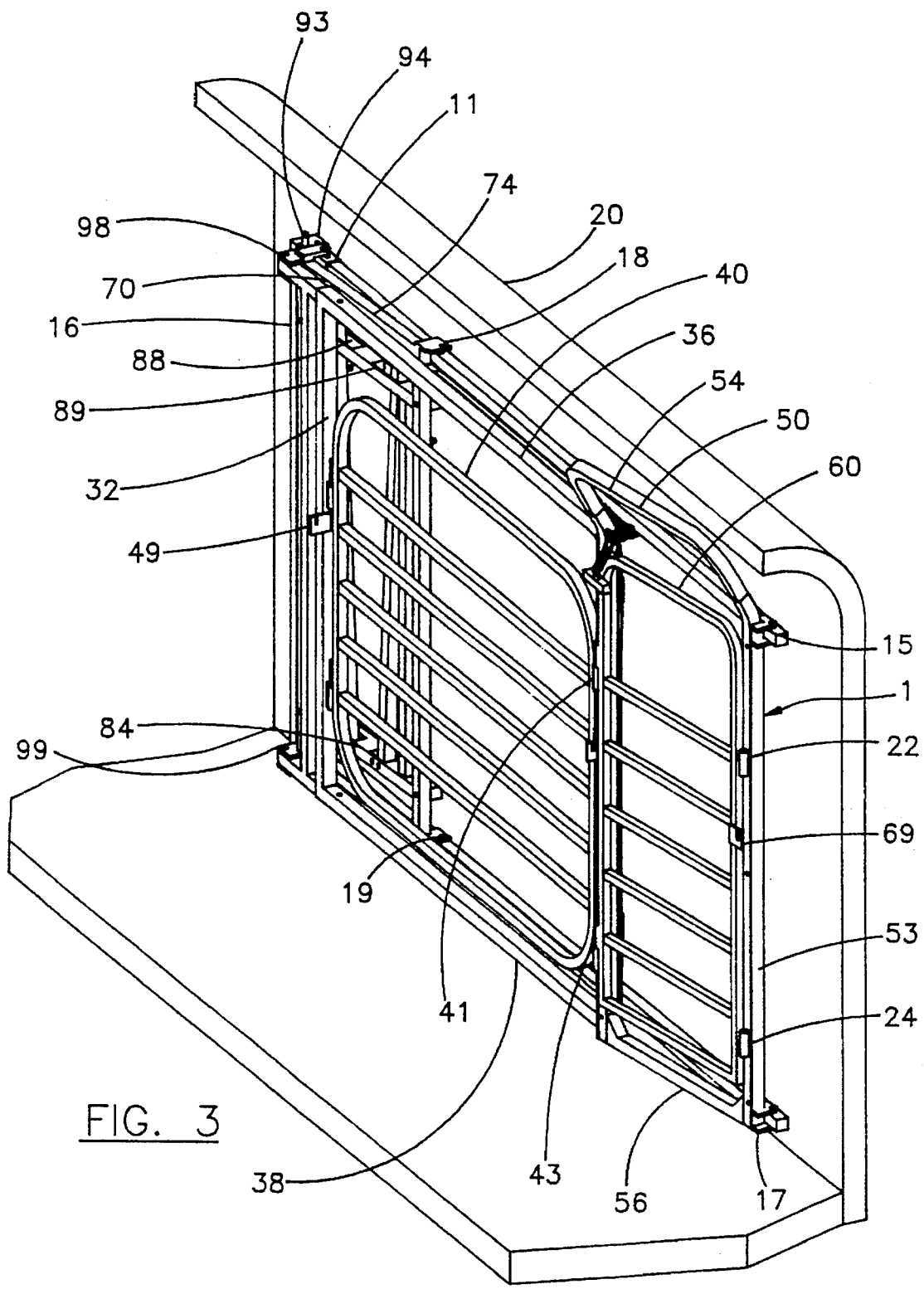
FIG. 3 is an elevated perspective view of the gate in the collapsed position as it would appear when not in use.

The apparatus incorporating the invention is schematically illustrated in FIGS. 1–9D. The invention relates to a collapsible livestock chute 1 shown generally in FIG. 1. The device is designed for use with livestock specifically in a stock trailer to transport animals or create a mobile clinic.

The chute can be used in a beef or dairy barns where space may be restricted. It may be used in passage ways that need to be cleaned or used without being permanently blocked, or calving rooms. The chute is collapsible and can be used to restrain animals in a variety of settings including for medical treatment or examination, PG testing, AI breeding, calving assistance or cesarean operations. It is preferably made of hardened steel molded of heavy-duty square tubing into the following panel structure.

The chute is designed to be quickly mounted on a flat surface such as the wall 20 of a trailer or inside a barn. Setup time is approximately 1–2 minutes. Though it may be detached, the chute is attached to the wall as an anchoring surface. This is accomplished by pivotal attaching a plurality of panels to a stationary first frame section 10 shown generally in FIGS. 1 and 6 mounted on a wall surface 20.

This stationary frame includes a top wall mounting rail 12 that runs transversely across the surface that is fixedly attached to it. The top wall mounting rail 12 runs substantially parallel to a bottom wall mounting rail 14. The two rails are separated from one another by a front spacer bar 16 that is bracketed to the front portion of each rail. The spacer bar is attached to the top rail by a front upper connecting bracket 11 shown from above in FIG. 1 and the top enlarged view of FIG. 7A. It is also connected to the bottom wall mounting rail 14 by the lower front connecting bracket 13 shown in the enlarged portion of FIG. 6. The rails are attached to the wall surface by means substantial enough to immobilize the chute. This includes bolting it to the wall surface in the preferred embodiment. The chute size in the preferred embodiment is approximately 30 inches wide by 7 feet long by 5 feet high for animal restraint.

The frame 10 is further stabilized by attachment on the opposing end to a rear frame 50. The top and bottom rails are bracketed in a manner similar to the front. The top rail 12 is received by the rear upper connecting bracket 15 on the rear vertical bar 53 as is shown in FIG. 9C. The bottom rail 12 is likewise received in the lower rear connecting bracket 17 of the rear vertical bar 53. This is shown in a rear elevated perspective in FIG. 1.

Figure 5:
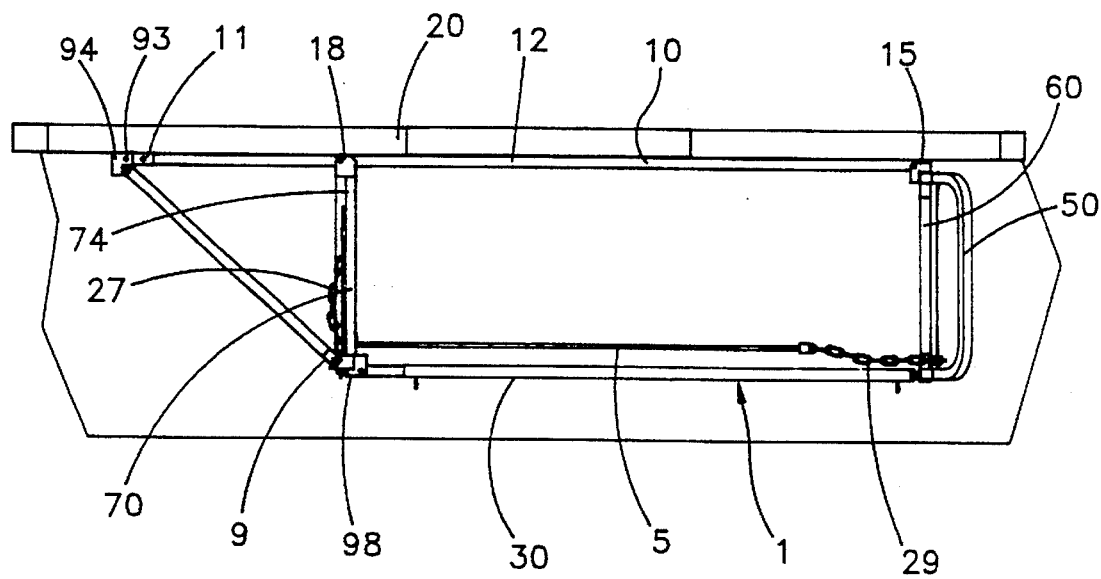
FIG. 5 is a top plan view of the chute locked in the expanded position as it would appear when confining an animal.
Figure 4:
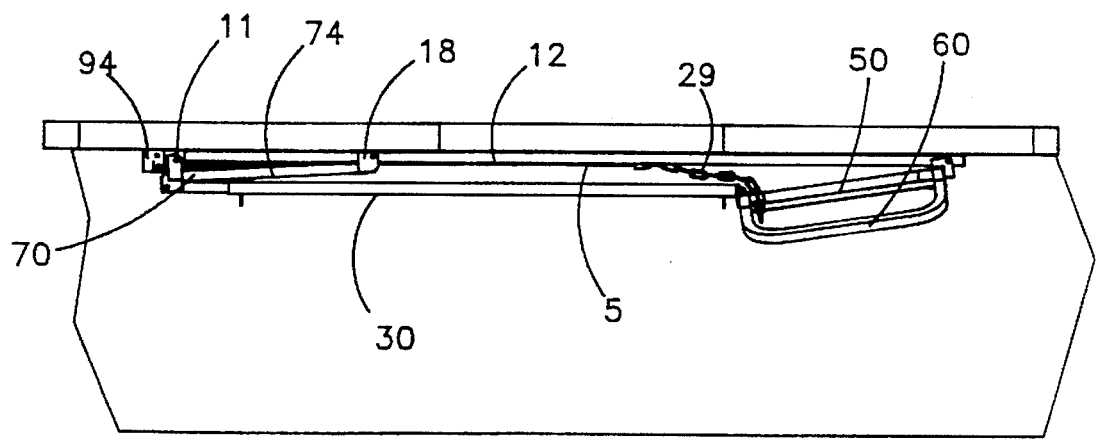
FIG. 4 is a top plan view of the chute in the forward position.

The top and bottom wall mounting rails 12 and 14 are further supported by attachment to the middle upper pivot mount 18 and middle lower pivot mount 19 respectively. These two pivot mounts are located at the top and bottom respectively of the front vertical bar 73 on the front frame 70. These pivot mounts give added support to the wall frame 10 at a point between the two ends. They also permit the front frame 70 which includes the headgate 80 to swivel allowing the center portion of the chute to collapse and fold up when so desired as is shown in FIGS. 4 and 5.

The chute is defined by disposing a plurality of pivotal mounted frames about the first frame 10 as is shown in FIG. 7A. This configuration defines a confinement area for holding animals for various purposes. The frames include a rear frame 50 that houses a rear gate 60, a side frame 30 that holds a side opening gate 40, and a front frame 70 that contains a headgate 80 with stanchions 86 and 87 for confining animals.

FIG. 1 shows the side frame 30 is spaced from and opposes the fixed wall frame 10. The side frame is a singular unit that is molded from steel material and is looped back on itself to form a substantially rectangular annular shape. The frame has opposing front side 32 and backside 34 vertical bars. The vertical bars are spaced from each other by opposing top 36 and bottom 38 transverse crossbars. The frame defines an opening large enough for an animal contained therein to exit through a hinged side gate 40 recessed in the side frame 30.

Figure 8:
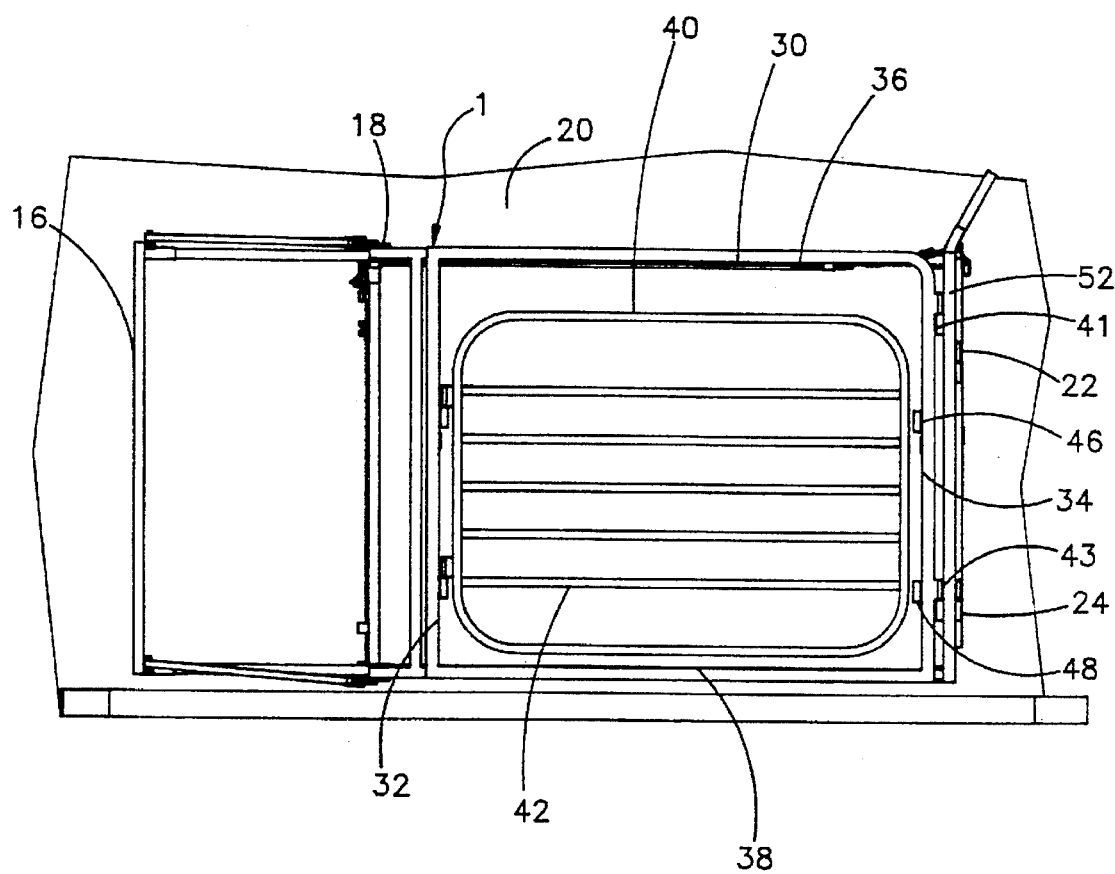
FIG. 8 is a side elevated view of the chute showing the gate in the collapsed position.

The side frame 30 is made from an annular steel beam 42 that is looped back upon itself and joined at each end thus forming a body that is substantially square as shown in FIG. 8. The gate frame also includes a plurality of crossbars 44 transversely connected to opposing sides of the beam forming a gate weldment. The gate preferably has an upper hinge 41 and a lower hinge 43 to provide support and to permit the gate to pivot.

In the most preferred embodiment the upper and lower hinges exist at both side ends of the gate so that the side gate can be hinged either way thus permitting the gate to open from either end that is desired as can be seen in FIG. 8. Hinges allow the confinement area to alternately open and close so that animals can be moved in and out of the chute. The side gate also has a latch 49 mounted against the side frame 30 to lock the gate in a closed position thereby restraining an animal. The most preferred embodiment includes a latch at either side end of the gate to permit fastening depending on which way the side gate is facing.

The second panel is shown in FIGS. 1 and 9A and is disposed about the wall frame. This is the rear frame 50 which is interposed between the rear portion of the side frame 30 and the rear portion of the mounting rails 12 and 14. The rear frame likewise has a left and right vertical bars 52 and 53 forming the sides. The top portion is an upper rear crossbar 54 that is elevated above the chute preferably to form a handgrip suitable for grasping. The bar is curved in the preferred embodiment to conform to the space available in certain stock trailers. The bottom of the rear frame includes a transverse lower rear crossbar 56. The rear frame forms a housing for a hinged rear gate 60.

The right vertical bar 53 can be attached on its inside to the hinged rear gate 60 by an upper rear pivot hinge 22 and a lower rear pivot hinge 24 shown in FIGS. 9A and 9B. The outside of the right rear vertical bar 53 is pivotal attached to the rear end of the wall mounting rails 14 and 16 by a rear upper connecting bracket 15 and a lower rear connecting bracket 17. The gate and frame are able to rotate forward when the gate is collapsed because the brackets are pivotal mounted on the top and bottom wall rails 12 and 14. This can be seen by comparing the extended position of FIG. 5 with the collapsed chute of FIG. 4.

The hinged rear gate 60 fits inside the rear frame. The rear gate is constructed of similar material and in like manner as the side gate 40. An annular beam 62 is looped back and joined to itself at each end. The gate includes a plurality of transverse crossbars 64 forming another gate weldment. The gate includes an upper rear gate hinge 61 and a lower rear gate hinge 63 permitting the gate to open and close.

Figure 6:
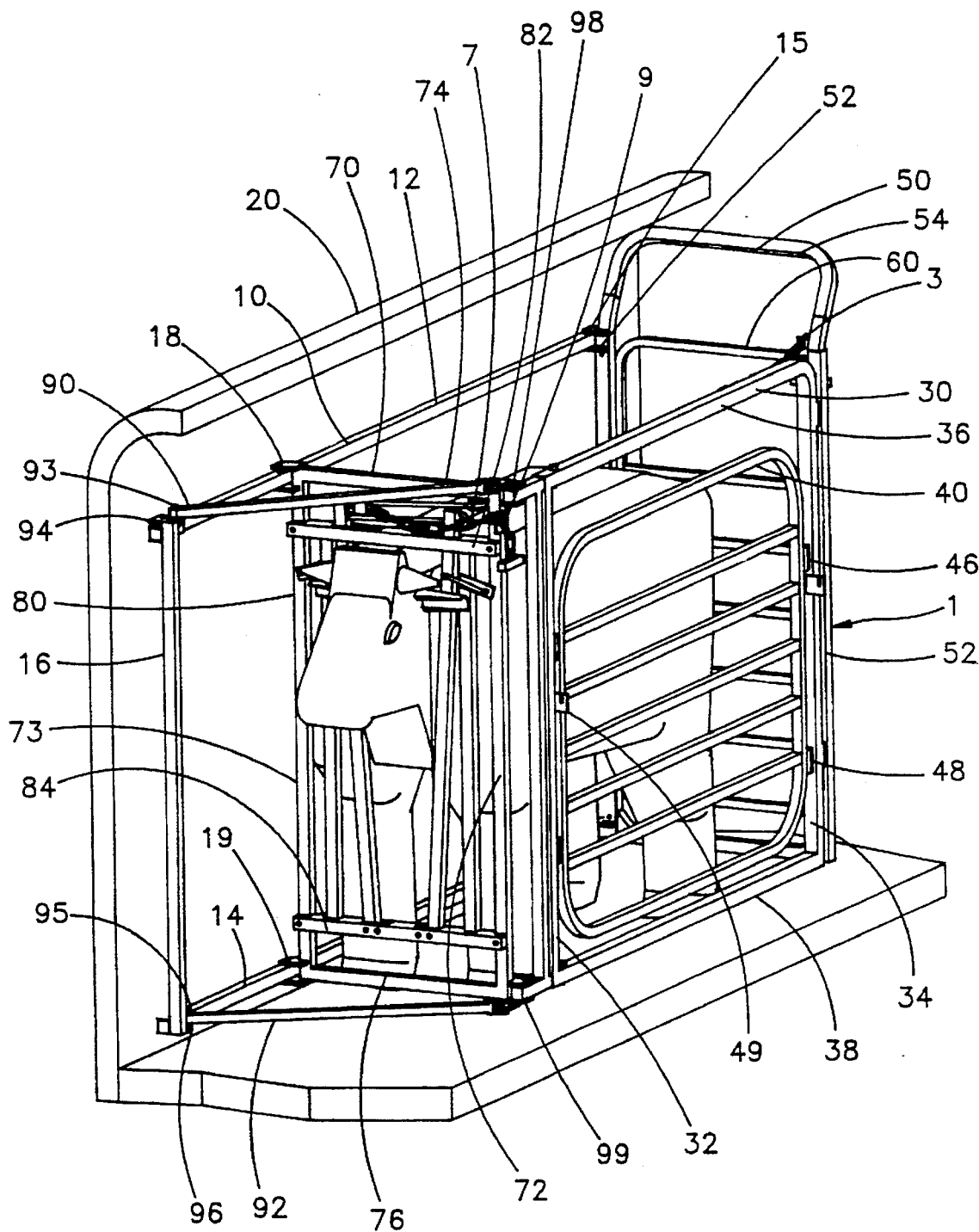
FIG. 6 is a right front view of the attached chute in the extended position with an animal confined therein.

The confinement area of the chute is completed with the front frame 70 portion that holds the headgate 80 as is shown in FIGS. 2B, 6, and 7C. The front frame consists of opposing left and right front vertical bars 72 and 73 respectively. The horizontal portion of the front frame includes upper and lower transverse front crossbars 74 and 76. The front frame defines an opening sized to house a headgate 80 for confining an animal in a stationary position.

The front left 72 and right 73 vertical bars are each pivotal attached respectively to the front side vertical bar 32 and the wall mounting rails 14 and 16. The preferred design of the chute includes a unique locking feature at the point where the front frame 70 connects to the side frame 30. This is shown in FIG. 2C. The tubular front portion of the side frame is sized to telescopically receive the respective end mating portion of the front frame. The mated portions are locked in place by an upper locking pin 35 that slides through an opening drilled through the top of the frame pieces. This strengthens the chute and prevents an animal from knocking it over if it becomes agitated and makes sudden or violent moves that strain against the gate. The chute includes a similar assembly on the lower side frame 38 utilizing a lower locking pin 37 shown in FIG. 2B.

The headgate 80 itself is removable attached to the front frame 70 by an upper front headgate crossbar 82 and a lower front headgate crossbar 84 between the front vertical bars 72 and 73. FIG. 7C show that the upper headgate crossbar 82 has two spaced slots 88 and 89 through which respective right and left stanchions extend 86 and 87. The stanchions are each pivotal fastened to the lower headgate crossbar 84 so that the top portion of the stanchions can move laterally within the slots alternately narrowing and widening the gap between them so that the head of an animal can be captured or set free when it is forced to the front of the chute.

The headgate 80 includes a remote locking mechanism shown in FIGS. 7C, 9A and 9D. Movement of the stanchions is controlled by a rope assembly controlled from the rear of the chute. In the preferred embodiment this mechanism includes a rope 5 that includes a handle portion 3 and runs from the rear frame 60 along the top crossbar 36 and is attached to the right stanchion 86. The mechanism further includes a means of interfacing the stanchions in an operative manner such that when the rope assembly is tightened from the rear by pulling the handle 3. The tension causes the stanchions to move toward one another to a first closed position thereby securing the head of an animal. The stanchions can be locked in the closed position by securing the headgate locking chain 7 to a latch 8 or released to a second open position by reversing the process.

The collapsible livestock chute can be positioned in a first expanded or a second collapsed position by rotating the moveable panels on their hinges and is shown in FIGS. 4 and 5. FIG. 6 shows the chute set in the first expanded position by using at least one pivotal mounted locking brace 90 that is attached on one end to a bracket 94 anchored on the top mounting rail 12 and on the second end to a bracket 98 on the top front frame 70. The preferred embodiment includes a second pivotal mounted locking brace 92 shown in FIG. 2B attached on a first end to a bracket 96 anchored on the bottom mounting rail 14 and pivotal attached on the other end to a bracket 99 on the bottom front frame.

The locking braces 90 and 92 may be disengaged from respective top and bottom locking pins 93 and 95 permitting the chute to rotate pivotal. The chute then folds forward to a collapsed position for storage. When the chute is collapsed forward a pin can be inserted in the top locking bracket 98 to hold the chute in a stationary position. The chute is shown in the collapsed position from a rear perspective in FIG. 3. Chute parts are reversible for left or right hand mounting.

I claim:

1. A collapsible livestock chute for restraining an animal including a first frame section having a top wall mounting rail and a bottom wall mounting rail, the top wall mounting rail being spaced from the opposing and substantially parallel bottom wall mounting rail by a front spacer bar attached to a front portion of each rail by a front upper connecting bracket and a front lower connecting bracket, each rail having a front and rear end, the first frame section further including means of attachment to the interior side surface of a trailer so that the first frame section is held in a fixed position when attached to the trailer wall, a plurality of pivotally mounted frames disposed about the first frame section defining a confinement area for animals further including a second side frame portion composed respectively of opposing front side and backside vertical bars and opposing top and bottom transverse crossbars, the vertical bars and crossbars being substantially parallel to one another and integrally attached at each respective end to define an opening sized to house a hinged side gate, the side frame portion being spaced from and substantially parallel to the first frame section, a rear frame portion composed respectively of two opposing rear vertical bars and opposing upper and lower transverse rear crossbars, the rear vertical bars and rear crossbars being substantially parallel to one another and integrally attached at each respective end to define an opening sized to house a hinged rear gate, the rear vertical bars each being pivotally attached respectively to a backside vertical bar and the rear end of the wall mounting rails, a front frame portion composed respectively of two opposing front vertical bars and opposing upper and lower transverse front crossbars, the front vertical bars and front crossbars being substantially parallel to one another and integrally attached at each respective end to define an opening sized to house a headgate for confining an animal in a stationary position, the front vertical bars each being pivotally attached respectively to the front side vertical bar and the wall mounting rails, the front frame including second means of attachment to the side frame, and means for securing the chute in a first expanded position or releasing it to a second collapsed position, the means for securing comprising at least one pivotally mounted locking brace engaging the first frame section and the front frame portion.

2. A collapsible livestock chute according to claim 1 where said pivotal mounted frames are configured vertically and substantially parallel to said first frame section when folded into said second collapsed position.

3. A collapsible livestock chute according to claim 2 where said pivotal mounted frames and said first frame section are attached by hinges.

4. A collapsible livestock chute according to claim 1 additionally comprising a hinged side gate recessed within said side frame portion, the side gate including an annular beam looped back and joined to itself at each end to form a substantially square body, a plurality of crossbars transversely connected to opposing sides of the beam, at least one hinge on the beam permitting the gate to pivotally mount to the side frame, and means to lock the gate in a closed position thereby restraining an animal therein.

5. A collapsible livestock chute according to claim 1 additionally comprising a hinged rear gate recessed within said rear frame portion, the rear gate including an annular rear beam looped back and joined to itself at each end to form a substantially square body, a plurality of crossbars transversely connected to opposing sides of the rear beam, at least one hinge on the beam permitting the gate to pivotally mount to the rear frame, and means to lock the gate in a closed position thereby restraining an animal therein.

6. A collapsible livestock chute according to claim 1 additionally comprising a headgate including an upper front headgate crossbar interposed between and attached to said front vertical bars and containing two spaced slots therein, a lower front headgate crossbar interposed between and attached to the vertical bars, at least two stanchions each having a lower first end pivotal attached to the lower headgate crossbar and an upper second end sized to extend through and extending through the respective slots.

7. A collapsible livestock chute according to claim 1 where the top and bottom of said front side vertical bar is attached to said wall mounting rail by hinged upper and lower middle pivot mounts interposed a given distance between the respective ends of said top and bottom wall mount rails configured such that the frames can fold into said second position.

8. A collapsible livestock chute according to claim 1 where said means for locking said chute in a said first or second positions includes a pivotal mounted locking brace attached on a first end to a bracket anchored on the top mounting rail and pivotal attached on a second end to a bracket anchored on the top of the front frame portion pivotally so that the locking brace may be disengaged at one end permitting the chute to rotate pivotally.

9. A collapsible livestock chute according to claim 6 where said means for securing said chute in a said first or second positions includes a second pivotal mounted locking brace attached on a first end to a bracket anchored on the bottom mounting rail and pivotally attached on a second end to a bracket anchored on the bottom of the front frame portion so that the locking brace may be disengaged at one end permitting the chute to rotate pivotally.

10. A collapsible livestock chute according to claim 1 where said means of attachment to the interior side surface of a trailer includes bolting said rails to the interior side surface.

11. A collapsible livestock chute according to claim 1 wherein the front frame portion includes upper and lower crossbars, the side frame portion includes top and bottom crossbars, and wherein the livestock chute additionally comprises third means for attachment of the upper and lower portion of the front frame portion to the top and bottom portions of the side frame portion, the third means for attachment including a tubular front portion of the side frame section sized to telescopically receive the respective end portion of the front frame portion, the top and bottom portions being lockable together in a stationary position by an upper locking pin and a lower locking pin that each slide through an opening drilled through the top of the corresponding frame pieces thereby strengthening the chute.

12. A collapsible livestock chute according to claim 1 additionally comprising left and right stanchions extending between the upper and lower transverse front crossbars for receiving the neck of a livestock animal therebetween, and a rope assembly to control the headgate from the rear of the chute, wherein the rope assembly includes a rope attached at respective ends to a front chain and a rear chain each having a handle portion, the rope assembly further including fourth means of attachment to the stanchions interfacing them in an operative manner so that tightening of the rope assembly from the rear by pulling on the handle causes the stanchions to move toward one another to a first closed position thereby securing the head of an animal by locking the front chain in a latch.

13. A collapsible livestock chute for restraining an animal including a first frame section having a top wall mounting rail and a bottom wall mounting rail, the top wall mounting rail being spaced from the opposing and substantially parallel bottom wall mounting rail by a front spacer bar attached to a front portion of each rail by a front upper connecting bracket and a front lower connecting bracket, each rail having a front and rear end, the first frame section being bolted to the interior side surface of a trailer so that the first frame section is held in a fixed position when attached to the trailer wall, a plurality of pivotally mounted frames configured vertically and substantially parallel to the first frame section when folded into a second collapsed position and disposed about the first frame section by hinges defining a confinement area for animals further including a second side frame portion composed respectively of opposing front side and backside vertical bars and opposing top and bottom transverse crossbars, the vertical bars and crossbars being substantially parallel to one another and integrally attached at each respective end to define an opening sized to house a hinged side gate, the second side frame portion being spaced from and substantially parallel to the first frame section and including a side gate recessed in the side frame portion, a rear frame portion composed respectively of two opposing rear vertical bars and opposing upper and lower transverse rear crossbars, the rear vertical bars and rear crossbars being substantially parallel to one another and integrally attached at each respective end to define an opening sized to house a hinged rear gate, the rear vertical bars each being pivotally attached respectively to a backside vertical bar and the rear end of the wall mounting rails, a front frame portion composed respectively of two opposing front vertical bars and opposing upper and lower transverse front crossbars, the front vertical bars and front crossbars being substantially parallel to one another and integrally attached at each respective end to define an opening sized to house a headgate for confining an animal in a stationary position, the front vertical bars each being pivotally attached respectively to the front side vertical bar and the wall mounting rails, the front frame portion including means of attachment to the side frame, a headgate including an upper front headgate crossbar interposed between and attached to said front vertical bars and containing two spaced slots therein, a lower front headgate crossbar interposed between and attached to the front vertical bars, at least two stanchions each having a lower first end pivotally attached to the lower headgate crossbar and an upper second end sized to extend through and extending through the respective slots in the upper front headgate crossbar, and a pivotally mounted locking brace attached on a first end to a bracket anchored on the top mounting rail and pivotally attached on a second end to a bracket anchored on the top of the front frame portion so that the locking brace may be disengaged at one end to thereby permit the chute to pivotally rotate between a first expanded position and as second collapsed position.

14. A collapsible livestock chute according to claim 13 including a second pivotally mounted locking brace for locking said chute in a said first or second position and being attached on a first end to a bracket anchored on the bottom wall mounting rail and pivotally attached on a second end to a bracket anchored on the bottom front frame portion so that the locking brace may be disengaged at one end permitting the chute to pivotally rotate.

15. A collapsible livestock chute according to claim 13 wherein the front frame portion includes upper and lower crossbars, the side frame portion includes top and bottom crossbars, and wherein the livestock chute additionally comprises means for attachment of the upper and lower portion of the front frame portion to the top and bottom portions of the side frame portion, the means for attachment including a tubular front portion of the side frame section sized to telescopically receive the respective end portion of the front frame portion, the two portions locked together in a stationary position by an upper locking pin and a lower locking pin that each slide through an opening drilled through the top of the corresponding frame pieces thereby strengthening the chute.

16. A collapsible livestock chute according to claim 13 additionally comprising left and right stanchions extending between the upper and lower front headgate crossbars for receiving the neck of a livestock animal therebetween, and a rope assembly to control the headgate from the rear of the chute, wherein the rope assembly includes a rope attached at respective ends to a front chain and a rear chain each having a handle portion, the rope assembly further including means of attachment to the stanchions interfacing them in an operative manner so that when the rope assembly is tightened from the rear by pulling the handle the stanchions move toward one another to a first closed position thereby securing the head of an animal by locking the front chain in a latch.

* * * * *